(12) United States Patent
Jo et al.

(10) Patent No.: US 9,301,149 B2
(45) Date of Patent: Mar. 29, 2016

(54) METHOD FOR PROVIDING INFORMATION SUCH THAT DIFFERENT TYPES OF ACCESS POINTS CAN COEXIST

(75) Inventors: Junho Jo, Gyeonggi-do (KR); Jihyun Lee, Gyeonggi-do (KR)

(73) Assignee: LG ELECTRONICS INC., Seoul (KR)

( * ) Notice: Subject to any disclaimer, the term of this patent is extended or adjusted under 35 U.S.C. 154(b) by 203 days.

(21) Appl. No.: 13/638,887

(22) PCT Filed: Mar. 31, 2011

(86) PCT No.: PCT/KR2011/002203
§ 371 (c)(1),
(2), (4) Date: Oct. 1, 2012

(87) PCT Pub. No.: WO2011/122861
PCT Pub. Date: Oct. 6, 2011

(65) Prior Publication Data
US 2013/0022013 A1    Jan. 24, 2013

Related U.S. Application Data

(60) Provisional application No. 61/319,882, filed on Apr. 1, 2010, provisional application No. 61/359,361, filed on Jun. 29, 2010, provisional application No. 61/380,196, filed on Sep. 3, 2010, provisional application No. 61/408,640, filed on Oct. 31, 2010.

(51) Int. Cl.
*H04W 4/00*    (2009.01)
*H04W 16/14*    (2009.01)
*H04B 15/00*    (2006.01)
(Continued)

(52) U.S. Cl.
CPC .............. *H04W 16/14* (2013.01); *H04B 15/00* (2013.01); *H04W 28/04* (2013.01); *H04W 72/02* (2013.01)

(58) Field of Classification Search
None
See application file for complete search history.

(56) References Cited

U.S. PATENT DOCUMENTS

2003/0142645 A1    7/2003   Belcea
2005/0185629 A1    8/2005   Kuroda et al.
(Continued)

FOREIGN PATENT DOCUMENTS

CN    1701533       11/2005
JP    2012-529780   11/2012
(Continued)

OTHER PUBLICATIONS

Paivi Ruuska et al., "P802.19.1 System Architecture", IEEE 802.19-10/46r3, Mar. 2010.*
(Continued)

*Primary Examiner* — Ayaz Sheikh
*Assistant Examiner* — Sori Aga
(74) *Attorney, Agent, or Firm* — Lee, Hong, Dergerman, Kang & Waimey

(57) ABSTRACT

Disclosed is a method for providing information for enabling different types of access points to coexist. The information providing method includes: receiving frequency information for broadcasting from a broadcast database server; obtaining information regarding different types of access points located in a certain area; generating information regarding one or more frequency bands that may be used by the different types of access points located in the certain area based on the frequency information for a broadcast; and transmitting information regarding the one or more available frequency bands to the different types of access points.

9 Claims, 10 Drawing Sheets

(51) Int. Cl.
*H04W 28/04* (2009.01)
*H04W 72/02* (2009.01)

(56) References Cited

U.S. PATENT DOCUMENTS

| | | |
|---|---|---|
| 2006/0013136 A1 | 1/2006 | Goldschmidt et al. |
| 2006/0195873 A1 | 8/2006 | Gopalan et al. |
| 2008/0089306 A1 | 4/2008 | Hu |
| 2008/0089389 A1 | 4/2008 | Hu |
| 2008/0205365 A1 | 8/2008 | Russell et al. |
| 2008/0253341 A1 | 10/2008 | Cordeiro et al. |
| 2008/0268832 A1* | 10/2008 | Peng .............................. 455/424 |
| 2009/0154409 A1 | 6/2009 | Kang et al. |
| 2010/0056136 A1 | 3/2010 | Zhu |
| 2010/0135256 A1 | 6/2010 | Lee et al. |
| 2010/0136974 A1 | 6/2010 | Kim et al. |
| 2010/0142559 A1 | 6/2010 | Hu |
| 2011/0019104 A1* | 1/2011 | Kwak et al. ................... 348/731 |
| 2011/0268024 A1 | 11/2011 | Jamp et al. |
| 2011/0286401 A1 | 11/2011 | Wijting et al. |
| 2011/0287802 A1 | 11/2011 | Ma et al. |
| 2011/0305206 A1* | 12/2011 | Junell et al. ................... 370/329 |
| 2012/0026883 A1 | 2/2012 | Chu et al. |
| 2012/0063383 A1 | 3/2012 | Barbieri et al. |
| 2012/0079559 A1 | 3/2012 | Reznik et al. |
| 2012/0120892 A1 | 5/2012 | Freda et al. |
| 2012/0134328 A1 | 5/2012 | Gauvreau et al. |

FOREIGN PATENT DOCUMENTS

| | | |
|---|---|---|
| KR | 1020040028294 | 4/2004 |
| KR | 1020070059924 | 6/2007 |
| KR | 1020090031445 | 3/2009 |
| KR | 1020090087178 | 8/2009 |
| KR | 1020090091798 | 8/2009 |
| KR | 1020090105304 | 10/2009 |
| KR | 1020100026913 | 3/2010 |
| KR | 1020100030171 | 3/2010 |
| WO | 2005/056251 | 6/2005 |

OTHER PUBLICATIONS

Päivi Ruuska et al., "P802.19.1 System Architecture", IEEE 802.19-10/46r3, Mar. 2010.
Mika Kasslin et al., "High Level Architecture View", IEEE 802.19-10/0019r0, Feb. 2010.
Philips, "First Cognitive Radio Networking Standard for Personal/Portable Devices in TV White Spaces and Initial Result of DVB-T and PMSE Detection", New Frontiers in Dynamic Spectrum, 2010 IEEE Symposium, Apr. 2010.
A. Delphinanto et al., "Improving Quality of Experience by Adding Device Resource Reservation to Service Discovery Protocols", Communications, 2008. ICC' 08. IEEE International Conference on May 2008.
Shao-Yi Hung et al., "An Opportunistic Cognitive MAC Protocol for Coexistence with WLAN", Communications, 2008. ICC' 08. IEEE International Conference, May 2008.
IEEE, "IEEE Standard for Local and metropolitan area networks, Part 16: Air Interface for Fixed Broadband Wireless Access Systems", IEEE Std 802.16/2004, Oct. 2004.
Alex Reznik et al. "Channel Selection Support in TVWS", IEEE 802.19-10/0104r0, Jul. 2010.
IEEE Computer Society and the IEEE Microwave Theory and Techniques Society, "Part 16: Air Interface for Broadband Wireless Access Systems," IEEE Standard for Local and metropolitan area networks, IEEE Std 802.16, May 2009, 2082 pages.
Sun, et al., "Coexistence Manager of Heterogeneous TVWS Networks," IEICE Technical Report, Mar. 2010, 7 pages.
Baykas, et al., "System Design Document," IEEE P802.19 Wireless Coexistence, doc.: IEEE 802.19-10/0055r3, Mar. 2010, 15 pages.
The State Intellectual Property Office of the People's Republic of China Application Serial No. 201180021985.0, Office Action dated Dec. 31, 2014, 6 pages.
Kasslin, "System Design Document," Wireless Coexistence, IEEE P802.19, Mar. 2010, 15 pages.
Eklund, "IEEE Standard 802.16: A Technical Overview of the WirelessMAN Air Interface for Broadband Wireless Access," IEEE Communications Magazine, Jun. 2002, pp. 98-107.

* cited by examiner

METHOD FOR PROVIDING INFORMATION SUCH THAT DIFFERENT TYPES OF ACCESS POINTS CAN COEXIST

CROSS-REFERENCE TO RELATED APPLICATIONS

This application is the National Stage filing under 35 U.S.C. 371 of International Application No. PCT/KR2011/002203, filed on Mar. 31, 2011, which claims the benefit of U.S. Provisional Application Ser. No. 61/319,882, filed on Apr. 1, 2010, U.S. Provisional Application Ser. No. 61/359,361, filed on Jun. 29, 2010, U.S. Provisional Application Ser. No. 61/380,196, filed on Sep. 3, 2010, and U.S. Provisional Application Ser. No. 61/408,640, filed on Oct. 31, 2010, the contents of which are all hereby incorporated by reference herein in their entirety.

TECHNICAL FIELD

The present invention relates to a technique for enabling different types of access points to coexist.

BACKGROUND ART

Conventionally arrangement or arrangement of frequency for a new service or allocation or arrangement of frequency to new service providers was led by the government.

In particular, when new corners have entered, the government allocated a new frequency to them through an auction, or the like, or collects an existing frequency from an existing service provider and re-deploy it for a different service provide, thereby allotting frequency as limited resource.

However, recently, as demand for wireless data traffic is explosively increased in the wake of the spreading of various wireless Internet-based applications such as open terminal platform, App store, mobile VoIP, and the like, the government-driven frequency allocation or arrangement is considered very ineffective and it is increasingly difficult to secure a new frequency on a table of frequency allocation fundamentally.

In particular, in line with the rapid growth of broadcast and communication systems, next-generation communication systems have been designed in a converged form of several networks and increasingly complicated, and the necessity of interaction or interworking is extending. Also, development of communication technologies and services has increased the frequency of use in frequency resources and the occupancy of a particular frequency band in a fixed manner to provide excellent communication techniques and services has caused severe depletion of frequency Recently, a frequency sharing scheme has come to prominence as a solution to the problems. This starts from a point of view that the current frequency shortage phenomenon is resulted from an existing partition type frequency management scheme and, although frequency appears to be insufficient on the table of frequency allocation but such frequency shortage can be solved through a sharing scheme.

As the depletion of frequency resources has been admitted to be significant worldwide, FCC (Federal Communications Commission) to the US decided to apply a cognitive radio technology, a frequency sharing technology, to a TV white space and revised a relevant regulation.

Such a movement is gradually extending, and in 2009, England has permitted the use of a CR (Cognitive Radio)-based frequency sharing technology in a band, included in a TV broadcast band, which is not spatially used, namely, a white space band. EU is discussing the introduction of the CR-based frequency sharing technology, and, also domestically, preparations for a frequency sharing policy using the white space band are being made.

The CR technology refers to a system in which a communication device observes a communication environment by itself, determines and selects an operation scheme for optimum communication, and makes a plan for a future determination process from a previous communication experience. Namely, the CR technology locates idle resource (spectrum hole, white space) which has low utilization or is temporally/spatially not used among frequency bands allocated to unlicensed band, and adaptively and opportunistically uses it. In this case, when a primary user having a license for a corresponding band is discovered, the use of the corresponding band should be stopped or transmit power is adjusted not to cause damage to the primary user.

Meanwhile, locating such an idle frequency band can be more conveniently implemented in a homogeneous communication system. However, heterogeneous communication systems, e.g., IEEE 802.16, WCDMA, or LTE, use different frequency bands, so it is very difficult to find an idle frequency band.

DISCLOSURE

Technical Problem

Therefore, an object of embodiments presented in the present disclosure is to solve the foregoing problems. In other words, an embodiment of the present invention is to enable heterogeneous communication systems to coexist on radio resource. In detail, an embodiment of the present invention is to enable several heterogeneous communication systems to coexist in terms of frequency or time.

Technical Solution

According to an aspect of the present invention, there is provided a method for providing information for enabling different types of access points to coexist.

The information providing method may include: receiving frequency information for broadcasting from a broadcast database server; obtaining information regarding different types of access points located in a certain area; generating information regarding one or more frequency bands that may be used by the different types of access points located in the certain area based on the frequency information for a broadcast; and transmitting information regarding the one or more available frequency bands to the different types of access points.

The information regarding one or more available frequency bands that can be used may further include information regarding an operating channel of the broadcast and a transmit power limitation.

The operating channel may be defined to be dependent to the broadcast data server and expressed in a combination of a center frequency and a bandwidth.

The operating channel of the broadcast may be defined by a regulation defined in the broadcast database server or an operating class.

The access points may use mutually different radio access technologies.

The information regarding one or more available frequency bands may be included in a coexistence map.

The method may further include: receiving a registration request from each of the access points; and registering each of the access points.

The method may further include: obtaining location information of each of the different types of access points; and checking whether or not the different types of access points are neighboring in the certain area based on the location information.

According to another aspect of the present invention, there is provided a server providing information enabling different types of access points to coexist. The server may include: a transceiver configured to receive frequency information from a broadcast database server and obtain information regarding the different types of access points located in a certain area; and a controller configured to generate one or more frequency bands that can be used by the different types of access points located in the certain area and transmit information regarding the one or more available frequency bands to the different types of access points through the transceiver.

Advantageous Effects

According to an embodiment presented in the present disclosure, several heterogeneous communication systems can coexist in radio resource. In detail, in an embodiment of the present invention, several heterogeneous communication systems can coexist in terms of frequency or time

BEST MODES

Figure 1:
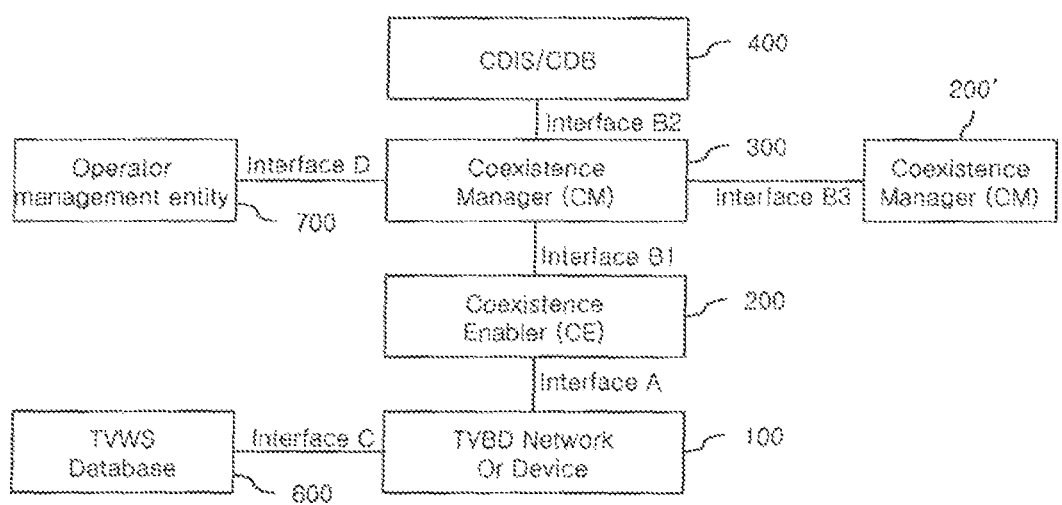
FIG. 1 is a block diagram showing a coexistence system according to an embodiment of the present disclosure.

The terminology used herein is for the purpose of describing particular embodiments only and is not intended to be limiting of the invention. Unless otherwise defined, all terms used herein have the same meaning as commonly understood by one of ordinary skill in the art to which this invention pertains, and should not be interpreted as having an excessively comprehensive meaning nor as having an excessively contracted meaning. If technical terms used herein is erroneous that fails to accurately express the technical idea of the present invention, it should be replaced with technical terms that allow the person in the art to properly understand. The general terms used herein should be interpreted according to the definitions in the dictionary or in the context and should not be interpreted as an excessively contracted meaning.

In the present application, it is to be understood that the terms such as "including" or "having," etc., are intended to indicate the existence of the features, numbers, operations, actions, components, parts, or combinations thereof disclosed in the specification, and are not intended to preclude the possibility that one or more other features, numbers, operations, actions, components, parts, or combinations thereof may exist or may be added.

While terms such as "first" and "second," etc., may be used to describe various components, such components must not be understood as being limited to the above terms. The above terms are used only to distinguish one component from another. For example, a first component may be referred to as a second component without departing from the scope of rights of the present invention, and likewise a second component may be referred to as a first component. The term "and/or" encompasses both combinations of the plurality of related items disclosed and any item from among the plurality of related items disclosed.

When a component is mentioned as being "connected" to or "accessing" another component, this may mean that it is directly connected to or accessing the other component, but it is to be understood that another component may exist therebetween. On the other hand, when a component is mentioned as being "directly connected" to or "directly accessing" another component, it is to be understood that there are no other components in-between.

The exemplary embodiments of the present invention will now be described with reference to the accompanying drawings, in which like numbers refer to like elements throughout. In describing the present invention, if a detailed explanation for a related known function or construction is considered to unnecessarily divert the gist of the present invention, such explanation has been omitted but would be understood by those skilled in the art. The accompanying drawings of the present invention aim to facilitate understanding of the present invention and should not be construed as limited to the accompanying drawings. The technical idea of the present invention should be interpreted to embrace all such alterations, modifications, and variations in addition to the accompanying drawings.

Hereinafter, a term of terminal is used, and the terminal may be called by other names such as UE (User Equipment), ME (Mobile Equipment), MS (Mobile Station), UT (User Terminal), SS (Subscriber Station), MSS (Mobile Subscriber Station), wireless device, handheld device, or AT (Access Terminal).

FIG. 1 is a block diagram showing a coexistence system according to an embodiment of the present disclosure. As shown in FIG. 1, the coexistence system includes a coexistence enabler (CE) 200 a coexistence manager (CM) 300, and a coexistence discovery and information server (CDIS) or a coexistence database (CDB) 400 according to functions.

The coexistence enabler (CE) 200 is connected with the coexistence manager (CM) 300 through an interface B1. The coexistence manager (CM) 300 is connected with the CDIS or CDB 400 through an interface B2. The coexistence manager 300 is connected with a coexistence manager (CM) 200' through an interface B3.

Also, the coexistence enabler (CE) 200 is connected with a television band device (TVBD) network or device 100 through an interface A. Here, the TVBD network or device 100 refers to a terminal available to use a TV white space in Federal Communication Commission (FCC). The TVBD network or device 100 may be connected with a TVWS database 600 through an interface C.

Meanwhile, the illustrated TVWS is an acronym of TV white space, and here, white space refers to an empty frequency band or an unused frequency band by a broadcast provider among VHF and UHF frequency bands for a TV broadcast, and the white space refers to an unlicensed band any one may use when conditions for a radiowave regulation are met. Namely, the TV white space may refer to information frequencies on for a broadcast. In detail, spatially, the TV white space refers to a band emptied in consideration of frequency interference between broadcast providers, a frequency band not used by a specific area, or a frequency band not in use in a specific area because broadcasting radiowaves do not reach the specific area, and temporally, the TV white space refers to an emptied broadcast frequency in a time slot during which a broadcast provider does not send a broadcast at dawn. A radio reception by TV viewers, clients of the broadcast provider, must not be interfered, and a portion of the band must not be used in order not to affect a wireless microphone device performing communication with a small output.

The coexistence enabler (CE) 200 may request information required for coexistence from the TVBD network or device 100 and obtain the same, and change structure change requests/commands and control information received from the coexistence manager (CM) 300 into TVBD-specific structure change requests/commands and sends the same to the TVBD network or device 100.

In order to solve the coexistence problem between TVBD networks, the coexistence manager (CM) 300 may have a function of searching different CMs, a coexistence decision making function of generating and providing a corresponding coexistence request/command and control information to the coexistence enabler (CE) 200, and a function of supporting exchanging of information required for coexistence between CMs (which may include a hierarchical or peer-to-peer decision making in disposing CMs).

Also, as explained hereinafter, the coexistence manager (CM) 300 may have a function of generating a coexistence white map for effectively sharing frequency resources between different networks and systems and a function of adjusting networks in performing management in relation to TVWS coexistence.

The coexistence manager (CM) 300 may be implemented in an embedded form in a device such as an access point (AP) or a base station (BS), or may be implemented outside a device.

The CDIS/CDB 400 may be represented by a CDIS, a CDB, or the like, according to functions thereof. The CDIS/CDB 400 may have a function of generating a coexistence white space map or a coexistence map in order to effectively share frequency resources between different networks and systems, a function of controlling a plurality of operators in performing management in relation to TVWS coexistence, and a function of electing a representative CM in order to reduce communication overhead between coexistence managers (CMs) and solve a coexistence problem.

Also, the CDIS/CDB 400 may perform a function of calculating a coexistence contour in order to search neighboring networks/systems. Here, the CDIS/CDB 400 may construct a database of respective TVBDs and neighboring TVBDs through the coexistence contour. When a location or transmit power of each TVBD is changed, the CDIS/CDB 400 updates the constructed database.

Also, the CDIS/CDB 400 may further perform one or more of a function of redirecting the coexistence whitespace map or the coexistence map according to the TVBD in order to solve the coexistence problem, a function of supporting searching of CMs by accelerating opening of an interface between CMs, and a function of collecting information for accelerating coexistence and synthetically providing the same.

In allocating resources, the CDIS/CDB 400 may omnipotently divide and provide resources, propose, as an intermediary, a reference (or a basis) of priority among the CMs 300 and perform tuning on resource selection of the respective CMs 300, or act as an information sharing medium between the exterior and heterogeneous networks between the CMs 300, as a database.

Meanwhile, the interface A is an interface between the coexistence enabler (CE) 200 and the TVBD network or the device 100, and information required for coexistence, a configuration/information request, a configuration/measurement/information response for coexistence, and different information as necessary may be provided from the TVBD network or device 100. A reconfiguration request/command and control information (which corresponds to a coexistence request/command and control information received from the CM), a request/command in relation to controlling of a measurement value performed by the TVBD network or device 100, information regarding available resource, and different information as necessary may be provided from the coexistence enabler (CE) 200 to the TVBD network or device 100.

The interface B1 is an interface between the coexistence enabler (CE) 200 and the coexistence manager (CM) 300. Information required for coexistence (information obtained from the TVBD network or device 100) and different information may be provided from the coexistence enabler (CE) 200 to the coexistence manager (CM) 300. From the CM 300 to the CE 200, a coexistence request/command and control information and different information as necessary may be provided.

The interface B2 is an interface between the CM and the CDIS/CDB 400. From the CM 300 to the CDIS/CDB 400, information required for the coexistence map, information required for a neighbor set, information required for registration/unenrollment, information required for searching (obtained by a currently used CM), information required for coexistence (obtained by a currently used CM), and information as necessary, and the like, may be provided.

From the CDIS/CDB 400 to the CM 300, information notified for the coexistence map, information notified for a neighbor set, information notified for a representative CM, information required for searching (obtained by a different CM), information required for coexistence (obtained by a different CM), different information, and the like, may be provided.

The interface B3 is an interface between the CM 300 and the CM 300'. From the CM 300 to the CM 300', information and a message required for searching and coexistence, information notified for registration/unregistration (from the CM to the representative CM or from the CM of a device to the CM of a server), information notified for coexistence (from the CM to the representative CM or from the CM of the server to the CM of the device), a different information, and the like, may be provided.

The interface C is an interface between the TVBD device 100 and the TVWS database 600. From the TVWS DB 600 to the TVBD network or device 100, information notified for an available channel may be provided.

The interface D is an interface between the CM 300 and an operator management entity (OME) 700. From the OME 700, information regarding the CM 300 and relevant network operation information (e.g., a limitation factor related to operation of a spectrum policy/network) and different information as necessary may be provided.

Figure 2:
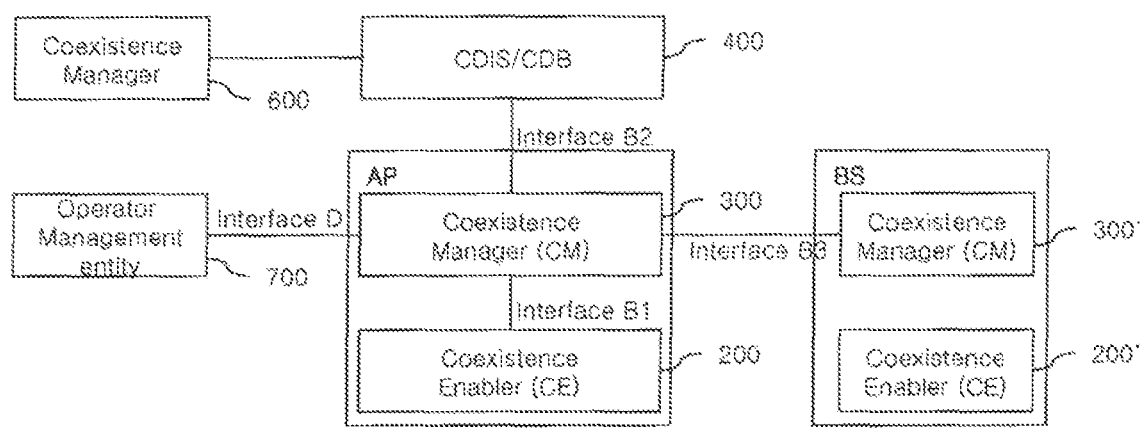
FIG. 2 is a block diagram showing a coexistence system according to another embodiment of the present disclosure.

FIG. 2 is a block diagram showing a coexistence system according to another embodiment of the present disclosure.

As can be understood from FIG. 2, the coexistence enabler (CE) 200 and the coexistence manager (CM) 300 may be embedded in an access point (AP) and a base station (BS).

Also, the CDIS/CDB 400 may be connected to the TVWS database 600. Through this connection, the CDIS/CDB 400 may receive TV whitespace information from the TVWS database 600.

Figure 3:
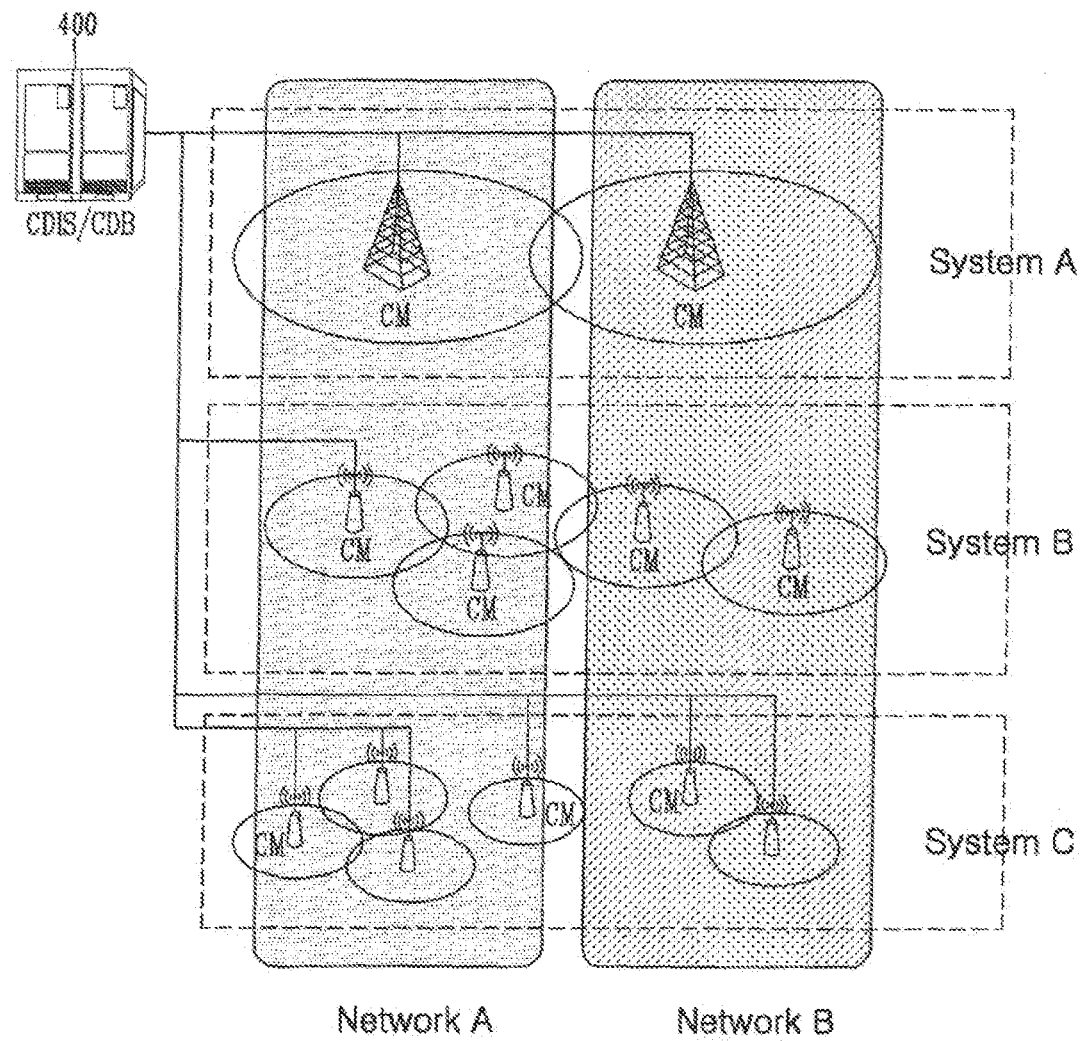
FIG. 3 is a view showing an example in which coexistence systems are disposed according to an embodiment of the present disclosure.

FIG. 3 is a view showing an example in which coexistence systems are disposed according to an embodiment of the present disclosure.

As can be understood from FIG. 3, a network A and a network B exist vertically. Also, a communication system A, a communication system B, and a communication system C exist horizontally. The communication system A, the communication system B, and the communication system C use mutually different wireless access schemes, namely, different communication schemes. For example, the communication system A may be, for example, a cellular communication system, e.g., CDMA, GSM, CDMA-2000, WCDMA, LTE, LTE-Advanced, or IEEE 802.16. The communication system B may be a cellular system having a cell coverage smaller than that of the communication system A. Or, the communication system B may be a system such as Wi-Fi. The communication system C may be a cellular system, e.g., a femto cell, having a cell coverage smaller than that of the system B. A coexistence manager (CM) exists in each of the communication system A, the communication system B, the communication system C.

Meanwhile, the communication system A, the communication system B, the communication system C geographically may coexist within the network A and geographically may coexist within the network B. Also, although systems are the same, if service providers are different, the systems may not be able to coexist. Thus, the CDIS/CDB 400 may generate a coexistence map and transmit the generated coexistence map to each CM.

Figure 4:
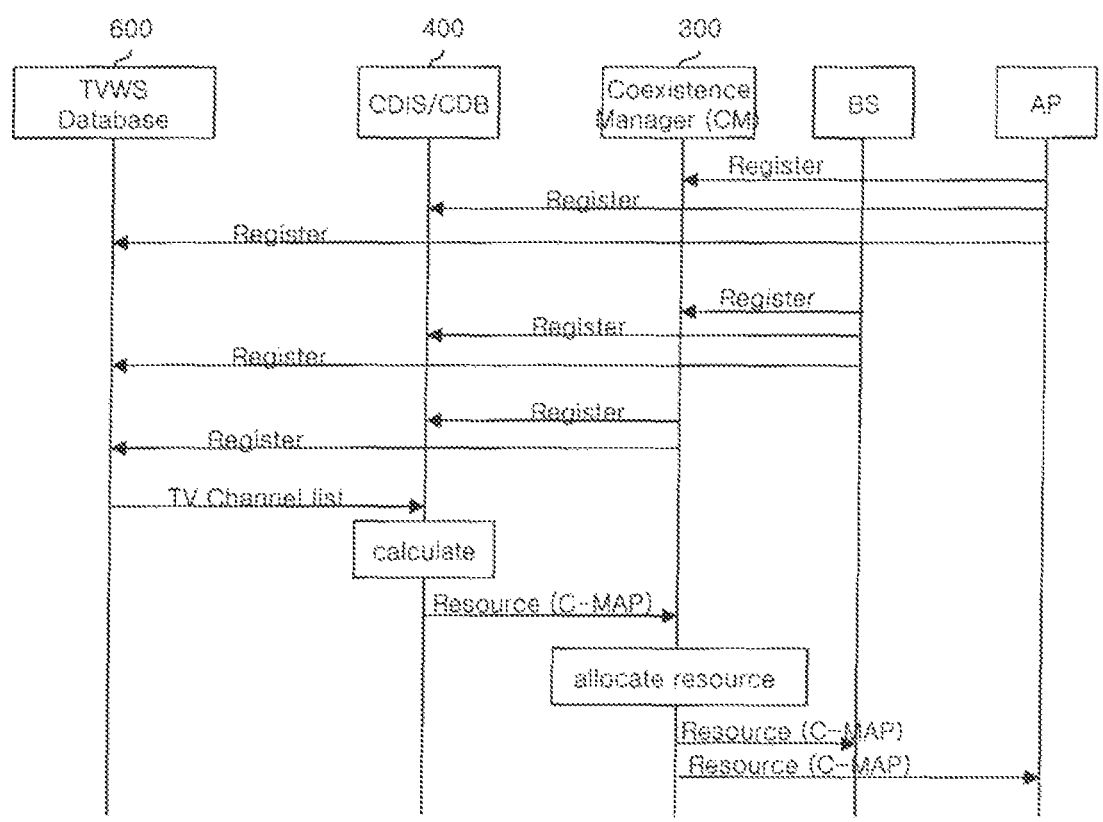
FIG. 4 is a view showing an operation of a coexistence system according to an embodiment of the present disclosure.

FIG. 4 is a view showing an operation of a coexistence system according to an embodiment of the present disclosure.

As can be understood from FIG. 4, it is noted that the CM 300 is not embedded in the AP or the BS, but this is merely illustrative, and the CM 300 may be embedded in the AP and the BS. Also, the coexistence enabler (CE) 200 may be embedded in the AP and the BS.

Meanwhile, the AP and the BS are registered to the CM 300. In this case, the AP and the BS may be directly registered to the CDIS/CDMA 400 and the TVWS database 600. Alternatively, when the AP and the BS performs registration to the CM 300, the CM 300 may perform registration to the CDIS/CDM 400 and the TVWS database 600, on behalf of the AP and the BS.

The CM 300 also performs registration to the CDIS/CDB 400 and the TVWS database.

Meanwhile, the CDIS/CDB 400 may receive a channel list for broadcasting from the TVWS database 600. The channel list may be frequency information for a broadcast. Also, the channel list may include information regarding an operating channel of the broadcast and a transmit power limitation.

The CDIS/CDB 400 checks whether the BS and the AP coexist within a certain area by using location information of the BS and the AP. When the BS and the AP coexist, the CDIS/CDB 400 may calculate a coverage radius of the AP and that of the BS, allocate channels (or resources) or one or more frequency bands that can be used by different types of access points, i.e., the AP and the BS, located in the certain area, based on the frequency information for broadcasting, generate information regarding the channel (or resource), e.g., a coexistence map, and transmit the same.

Figure 5:
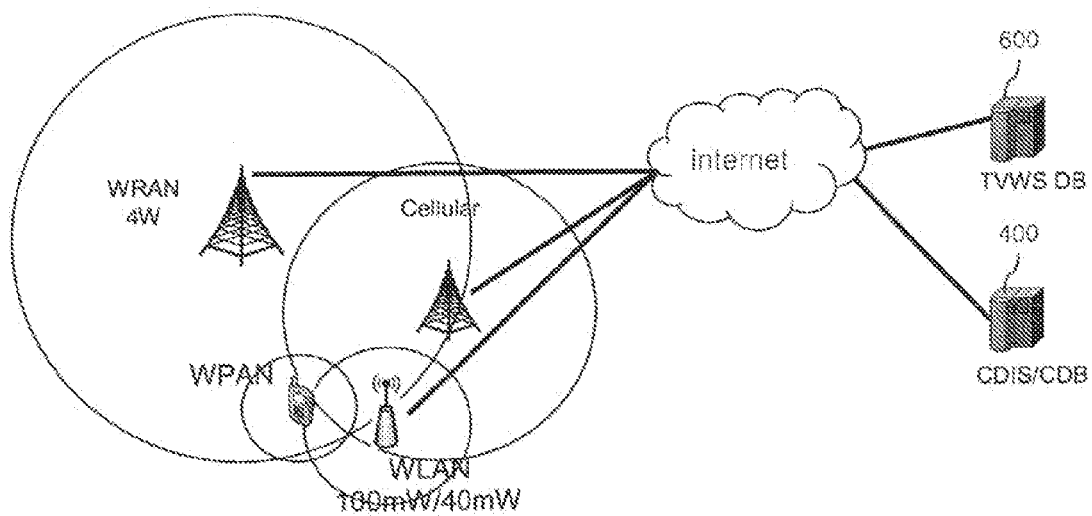
FIG. 5 is a view showing an example in which coexistence systems are disposed according to another embodiment of the present disclosure.

FIG. 5 is a view showing an example in which coexistence systems are disposed according to another embodiment of the present disclosure.

As can be understood from FIG. 5, the CM or the CDIS/CDB 400 may regulate such that several APs coexist in the wireless domain. The several APs may be connected to the CDIS/CDB 400 by using a physical connection such as the Internet.

The CDIS/CDB 400 may obtain channel information for broadcasting from the TVWS database 600, as mentioned above. Also, the CDIS/CDB 400 may obtain channel information for broadcasting in a particular geographical area, e.g., a broadcast channel set. Also, the CDIS/CDB 400 may calculate a coexistence contour. In particular, the CDIS/CDB 400 may have a neighbor detection function in different systems operating on the TV broadcasting whitespace or TV broadcasting frequency.

Also, as mentioned above, the CDIS/CDB 400 may generate a coexistence whitespace map or a coexistence map. Also, the CDIS/CDB 400 may provide common clock information. Also, the CDIS/CDB 400 may provide information for time synchronization between different systems.

The CDIS/CDB 400 may provide a parameter regarding a radio range and interference range of each device. The CDIS/CDB 400 may provide a parameter regarding the foregoing coexistence contour. The CDIS/CDB 400 may identify neighbor network devices for coexistence between different systems. The CDIS/CDB 400 may provide information regarding transmit power of each network, an antenna height, a different physical parameter.

Figure 6:
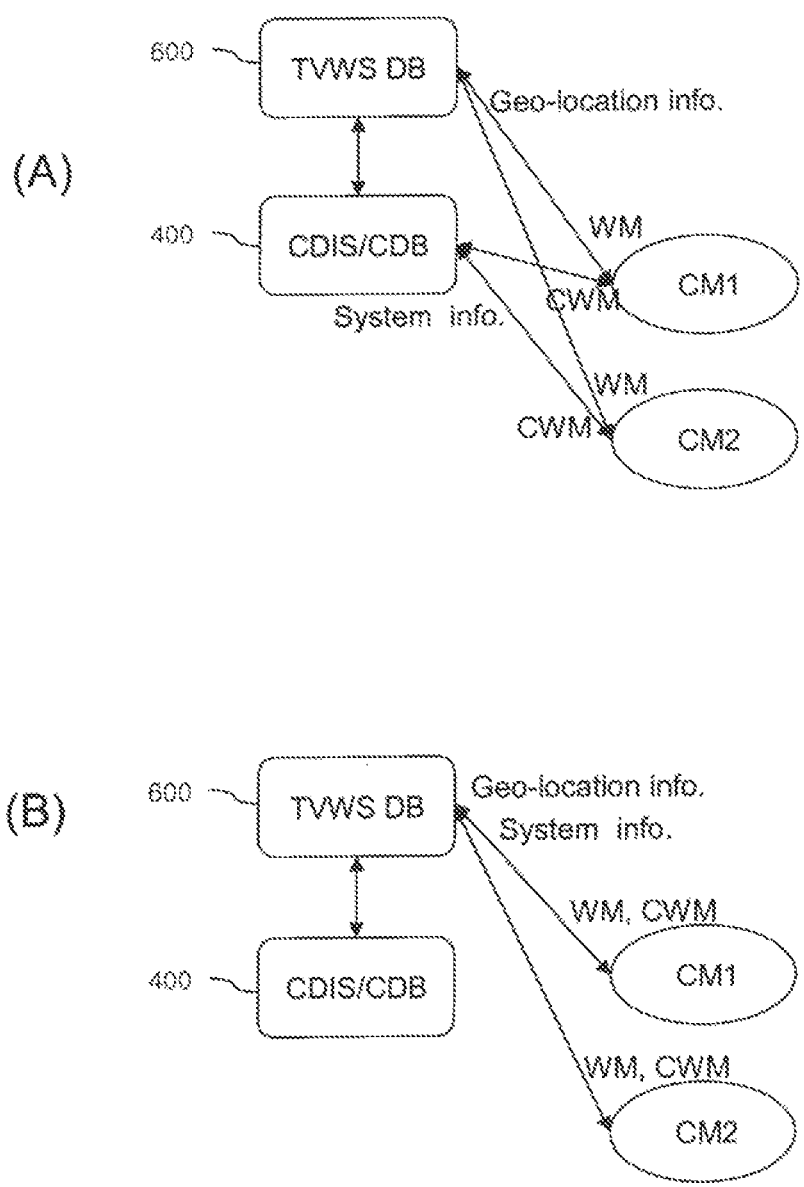
FIG. 6 is a view showing an operation of a CDIS/CDB 400.

FIG. 6 is a view showing an operation of the CDIS/CDB 400.

As can be understood from FIG. 6(A), a first coexistence manager CM1 and a second coexistence manager CM2 exist, and these are connected with the TVWS DB 600 and the CDIS/CDB 400, respectively. The first coexistence manager CM1 and the second coexistence manager CM2 receive location information and the frequency information for broadcasting, e.g., information regarding the whitespace map (WM), from the TVWS DB 600. The whitespace map may refer to information regarding an empty frequency band which is not used by a broadcast provider in the VHF and UHF frequency bands for TV broadcasting. Meanwhile, the CDIS/CDB 400 may receive frequency information for a broadcasting service, e.g., the whitespace map, from the TVWS DB 600. And, as mentioned above, the CDIS/CDB 400 may generate a coexistence whitespace map (CWM) or a coexistence map based on the frequency information for a broadcasting service, e.g., whitespace map. Also, the CDIS/CDB 400 may transfer the generated CWM or the coexistence map to the first coexistence manager CM1 and the second coexistence manager CM2.

Meanwhile, as can be understood from FIG. 6(B), the first coexistence manager CM1 and the second coexistence manager CM2 are connected to the TVWB DB 600. The TVWB DB 600 may be connected to the CDIS/CDS 400.

The CDIS/CDB 400 may transfer the foregoing coexistence whitespace map (CWM) or the coexistence map to the TVWS DB 600 and the TVWS DB 600 may transfer the received CWM or the coexistence map to the first coexistence manager CM1 and the second coexistence manager CM2. In this case, the TVWS DB 600 may disguise the received CWM or the coexistence map as frequency information, e.g., the whitespace map, for the broadcast and transfer the same to the first coexistence manager CM1 and the second coexistence manager CM2. In this case, when the first coexistence manager CM1 and the second coexistence manager CM2 receive the frequency information, e.g., the whitespace map, as well as the already received CWM and the coexistence map, they may select an appropriate one to use.

Figure 7:
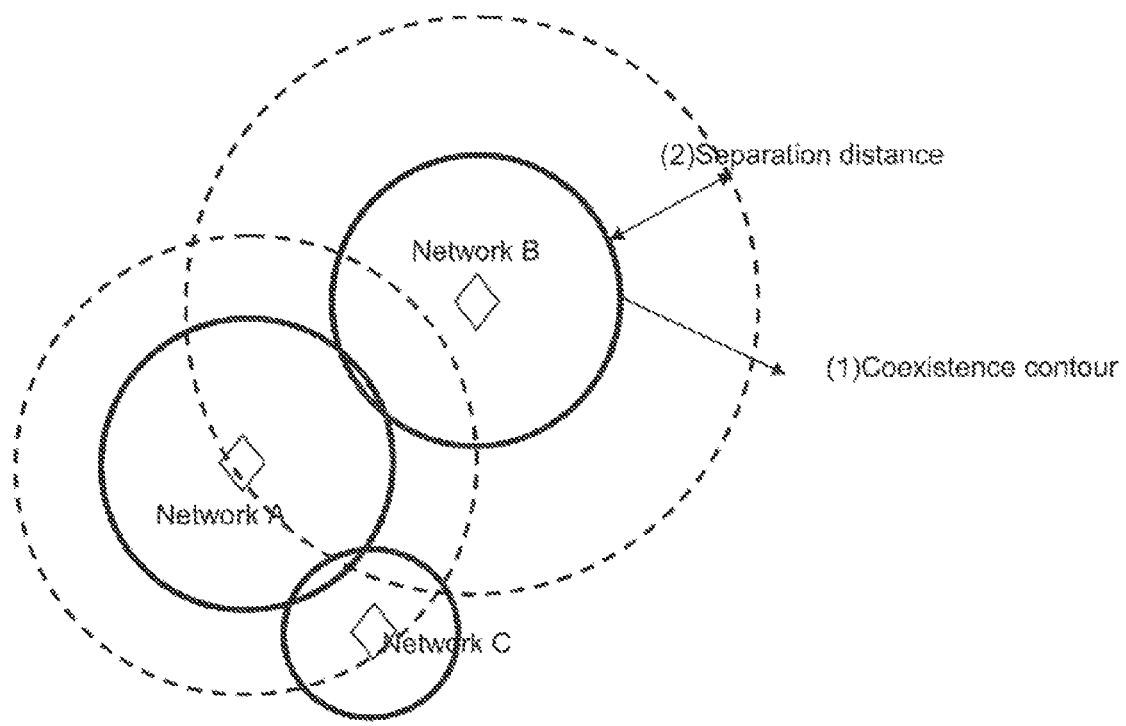
FIG. 7 is a view showing a coexistence contour.

FIG. 7 is a view showing a coexistence contour.

As can be understood from FIG. 7, the network A, the network B, and the network C exist in the proximity to each other. The coexistence contours of the respective networks are indicated by the solid lines and isolation distances of the respective networks are indicated by the dotted lines. The coexistence contours are determined by the characteristics of the respective networks. Meanwhile, the isolation distances may be determined by the characteristics with respect to the other (adjacent) networks.

A neighboring network or system may be calculated through the coexistence contours. The coexistence contours are distances guaranteeing a particular signal strength or transfer rate of each system, which can be calculated by using an appropriate path loss model. The neighboring network or system may be calculated by using transmit power, an antenna length, a usage frequency, a path loss model. The isolation distance refers to a distance available for interference from a different system. As can be understood from FIG. 7, the coexistence contours of the network A and the network B are almost in contact and coexistence contours of the network A and the network C partially overlap. Thus, in order to coexist in the same frequency band as in the network A, preferably, the network A is positioned to be spaced apart by the isolation distance of the network A from the coexistence distance of the network B.

However, the coexistence contours may be separated without being limited to the illustration of FIG. 7

Figure 8:
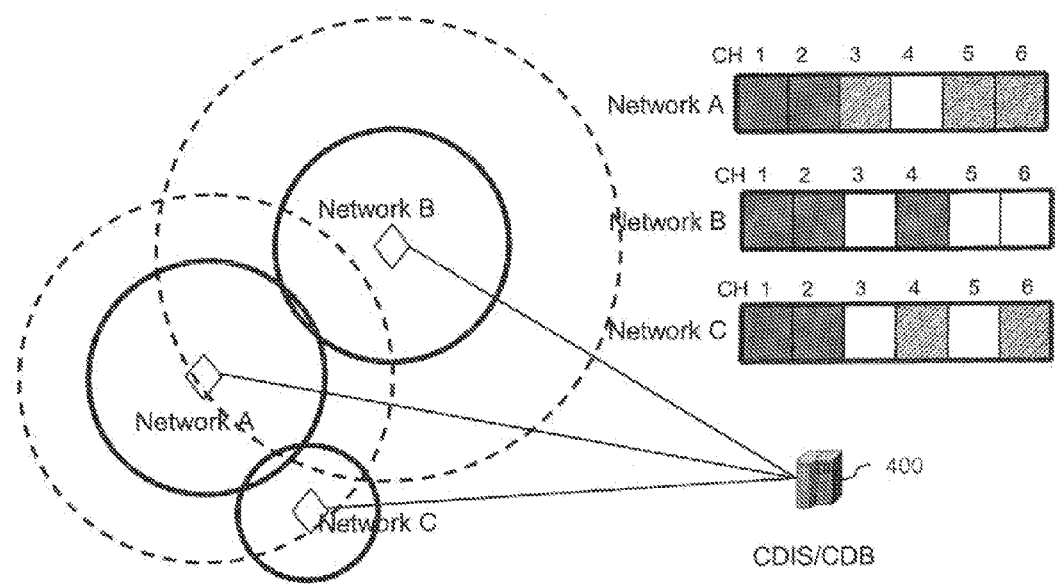
FIG. 8 is a view showing an example of a coexistence whitespace map (CWM) or a coexistence map in the environment of FIG. 7.

FIG. 8 is a view showing an example of the coexistence whitespace map (CWM) or the coexistence map in the environment of FIG. 7.

As illustrated at an upper portion of the right side of FIG. 8, it is assumed that channel 1 to channel 6 exist.

The CDIS/CDB 400 informs the network A and the network C about the CWM or the coexistence map indicating that channel 1 and channel 2 are used for broadcasting according to the frequency information, e.g., the whitespace map (CWM).

Also, the CDIS/CDB 400 may inform the network A that channel 4 is an idle channel as illustrated in the whitespace map (CWM) or the coexistence map. Here, channel 4 may be used by the network A.

The CDIS/CDB 400 may inform the network B that channel 3, channel 5, and channel 6 are idle channels through the CWM or the coexistence map. Here, channel 6 may be used by the network B.

The CDIS/CDB 400 may inform the network C that channel 3 and channel 5 are idle channels through the CWM or the coexistence map.

In this manner, the CDIS/CDB 400 may provide information about the channel, which is actually used in a different system, but appears as a channel being used for the TV. To this end, the CDIS/CDB 400 may calculate a relationship between the network A and the network B and a relationship between the network B and the network C, and allocate resources such that the resources are not repeated in neighboring systems.

In this manner, the CDIS/CDB 400 may transmit the CWM or the coexistence map to the networks A, B, and C, whereby the networks A, B, and C can coexist in the wireless domain.

Figure 9:
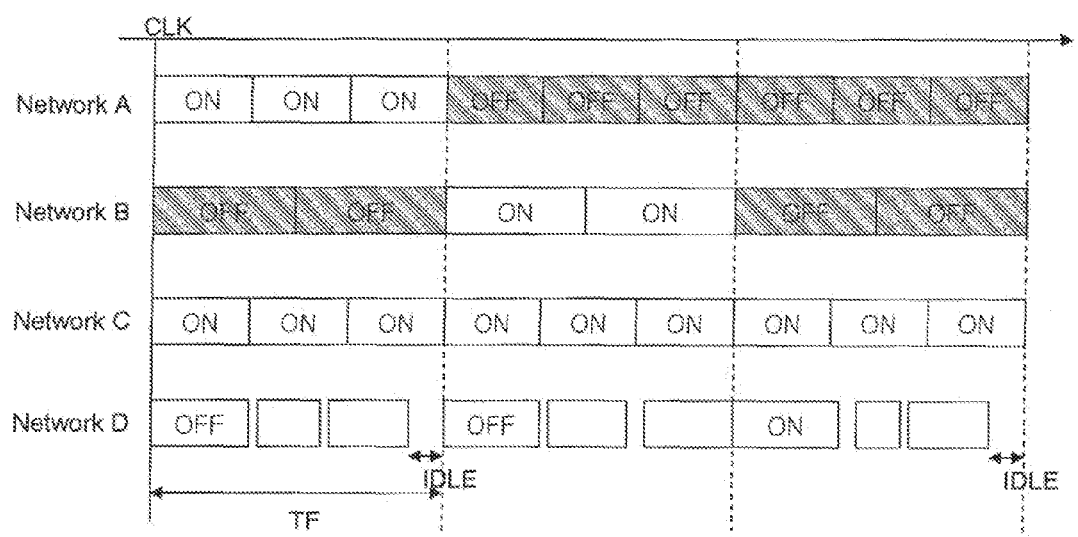
FIG. 9 is a view showing an example in which the CDIS/CDB 400 provides a common clock in the environment of FIG. 7.

FIG. 9 is a view showing an example in which the CDIS/CDB 400 provides a common clock in the environment of FIG. 7.

As can be understood from FIG. 9, the CDIS/CDB 400 provides common clocks shared by temporally scheduled networks.

As illustrated, a frame length of each network system in the network A, the network B, and the network C may be a least common multiple (LCM). For example, the length of three frames may be the LCM in the network A, the length of two frames may be the LCM in the network B, and the length of three frames may be the LCM in the network C.

In this manner, the CDIS/CDB 400 may provide the common clock for every LCM frame length.

Meanwhile, the frame length of the network D may not be the LCM with the frame lengths of the network A, network B, and network C. In this case, the network D may have a silent duration.

Figure 10:
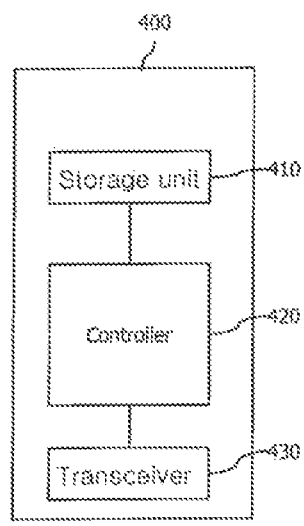
FIG. 10 is a block diagram showing the configuration of the CDIS/CDB 400 according to an embodiment of the present invention.

FIG. 10 is a block diagram showing the configuration of the CDIS/CDB 400 according to an embodiment of the present invention.

As shown in FIG. 10, the CDIS/CDB 400 includes a storage unit 410, a controller 420, and a transceiver 430.

The storage unit 410 stores the methods according to the embodiments illustrated in FIGS. 1 to 9.

The controller 420 controls the storage unit 410 and the transceiver 430. In detail, the controller 420 executes the methods stored in the storage unit 410. The controller 420 transmits the foregoing signals through the transceiver 430.

The exemplary embodiments of the present invention will now be described with reference to the accompanying drawings, in which like numbers refer to like elements throughout. In describing the present invention, if a detailed explanation for a related known function or construction is considered to unnecessarily divert the gist of the present invention, such explanation has been omitted but would be understood by those skilled in the art. The accompanying drawings of the present invention aim to facilitate understanding of the present invention and should not be construed as limited to the accompanying drawings. The technical idea of the present invention should be interpreted to embrace all such alterations, modifications, and variations in addition to the accompanying drawings.

The invention claimed is:

1. A method for allocating channels, the method comprising:
   receiving information including a list of available channels from a TVWS (television white space) database;
   selecting a non-overlapping channel for each TVBD (television band device) network or device among a plurality of TVBD networks including a first network, a second network, and a third network or devices;
   transmitting information including the non-overlapping channel to each TVBD network or device; and
   providing a common clock to both the first network and the second network at every timing corresponding to a least common multiple (LCM) of a frame length of the first network and a frame length of the second network,
   wherein when coexistence contours of the first network and the second network, which indicate distances guaranteeing a particular signal strength or transfer rate, overlap each other and a specific channel is used by the first network, the specific channel in a coexistence white space map for the second network is marked as being occupied by a TV device other than the first network, and wherein the third network is provided with a silent duration at the every timing corresponding to the LCM of the frame length of the first network and the frame length of the second network if a frame length of the third network does not correspond to the LCM of the frame length of the first network and the frame length of the second network.

2. The method of claim 1, further comprising:
receiving a first registration request message for each TVBD network or device.

3. The method of claim 1, further comprising:
transmitting a second registration request message to a CDIS (coexistence discovery and information server).

4. The method of claim 3, wherein the CDIS has functions of at least one of:
calculating neighbor TVBD networks or devices, or
selecting a master CM (coexistence manager).

5. The method of claim 1, wherein the plurality of TVBD networks or devices use different types of network technologies.

6. The method of claim 1, wherein the method is performed by a CM (coexistence manager), and the CM has functions of at least one of:
making coexistence decisions related to reconfiguration of the plurality of TVBD networks or devices, or
exchanging information required for coexistence.

7. The method of claim 1, wherein the available channels are determined based on a location of the TVBD network or device.

8. The method of claim 1, wherein the information including a list of available channels further includes transmit power limit.

9. An apparatus for allocating channels, the apparatus comprising:
a transceiver configured to receive information including a list of available channels from a TVWS (television white space) database; and
a controller configured to:
select a non-overlapping channel for each TVBD (television band device) network or device among a plurality of TVBD networks including a first network, a second network, and a third network or devices;
control the transceiver to transmit information including the non-overlapping channel to each TVBD network or device; and
provide a common clock to both the first network and the second network at every timing corresponding to a least common multiple (LCM) of a frame length of the first network and a frame length of the second network,
wherein when coexistence contours of the first network and the second network, which indicate distances guaranteeing a particular signal strength or transfer rate, overlap each other and a specific channel is used by the first network, the specific channel in a coexistence white space map for the second network is marked as being occupied by a TV device other than the first network, and
wherein the third network is provided with a silent duration at the every timing corresponding to the LCM of the frame length of the first network and the frame length of the second network if a frame length of the third network does not correspond to the LCM of the frame length of the first network and the frame length of the second network.

\* \* \* \* \*